Nov. 16, 1937.  A. G. F. KUROWSKI  2,099,123
COMBINED TYPEWRITING AND COMPUTING MACHINE
Original Filed March 15, 1933    6 Sheets-Sheet 1
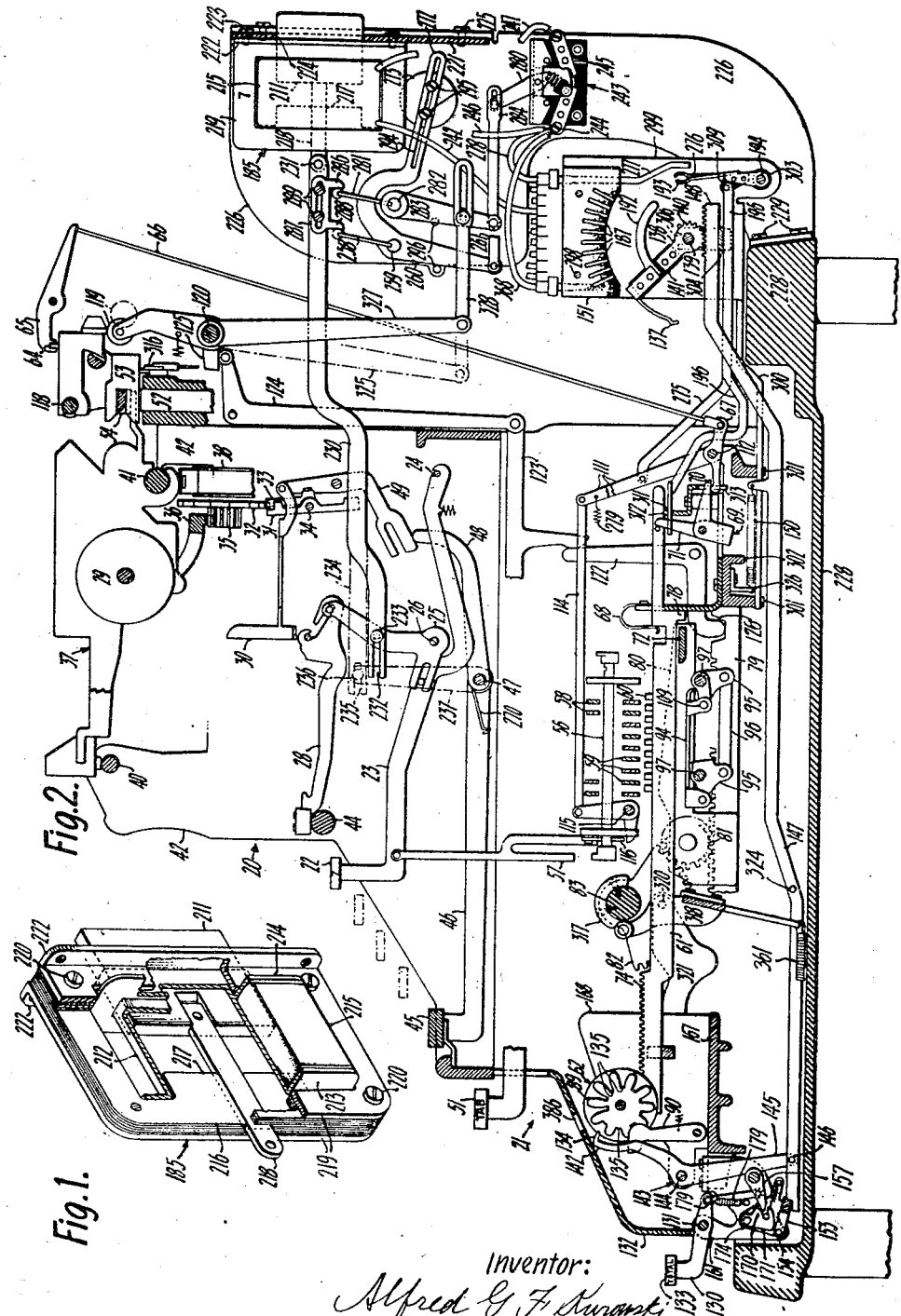

Nov. 16, 1937.  A. G. F. KUROWSKI  2,099,123
COMBINED TYPEWRITING AND COMPUTING MACHINE
Original Filed March 15, 1933  6 Sheets-Sheet 2
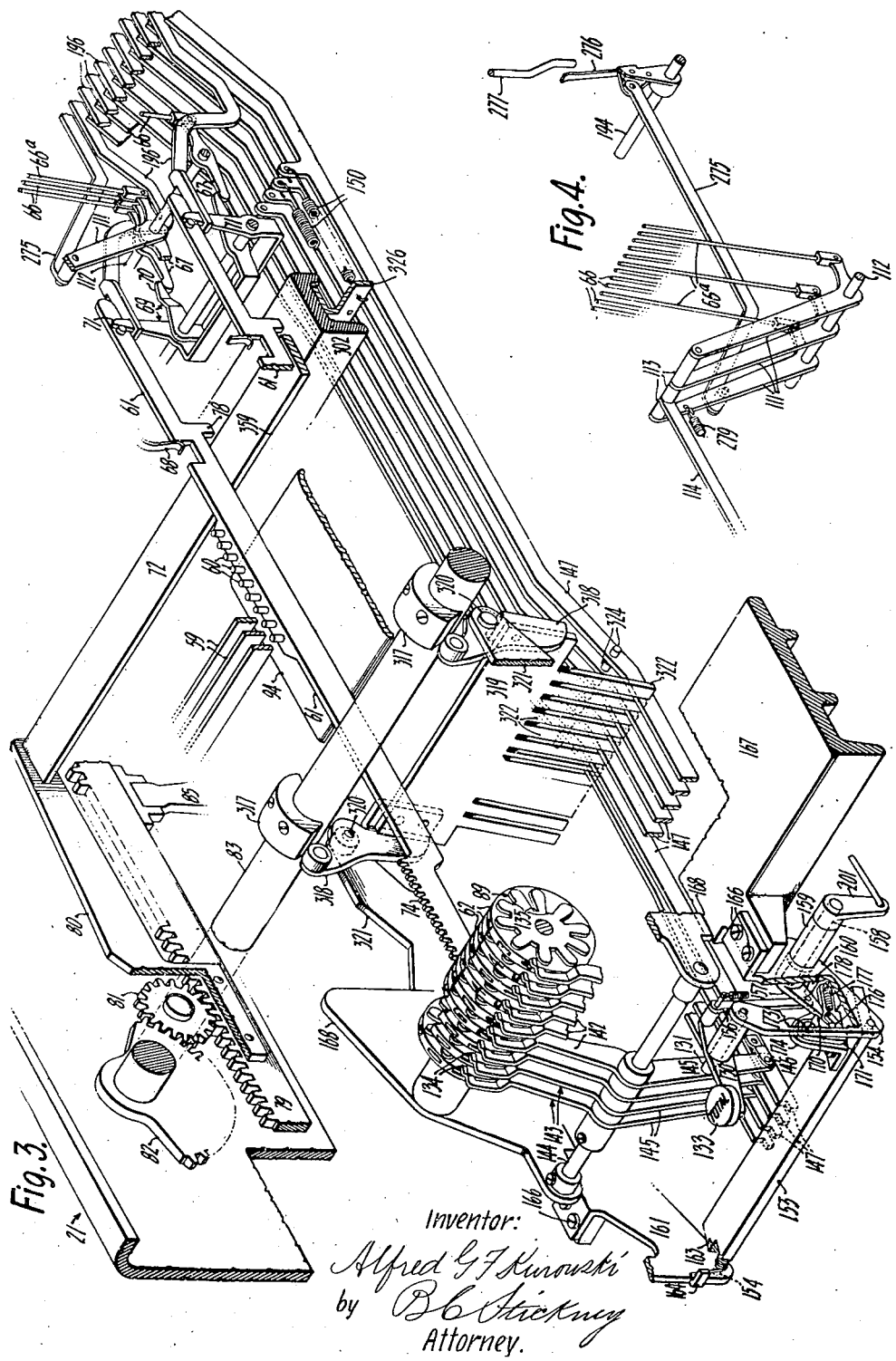

Nov. 16, 1937. A. G. F. KUROWSKI 2,099,123
COMBINED TYPEWRITING AND COMPUTING MACHINE
Original Filed March 15, 1933 6 Sheets-Sheet 3

Inventor:
Alfred G F Kurowski
by B C Stickney
Attorney.

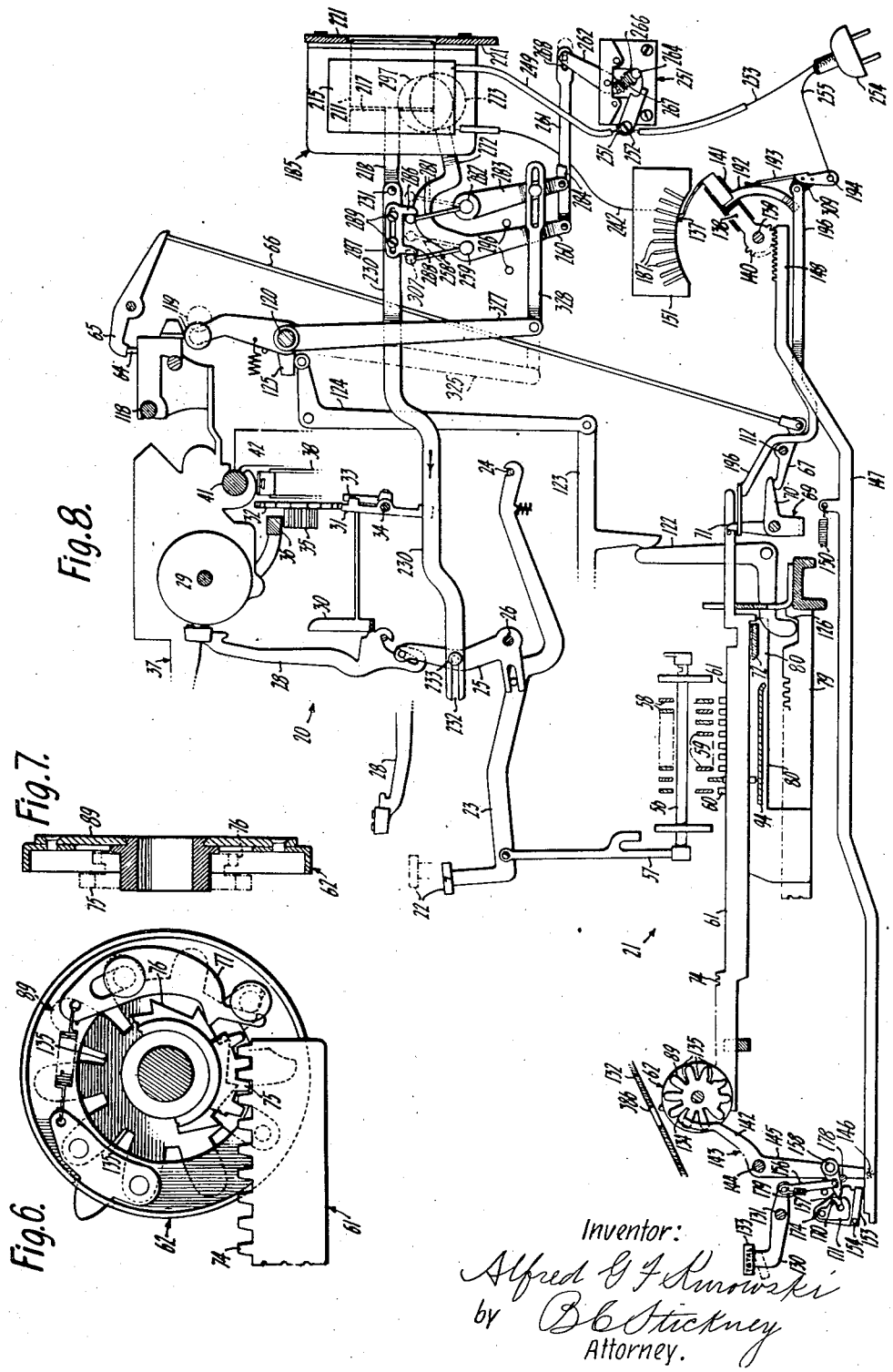

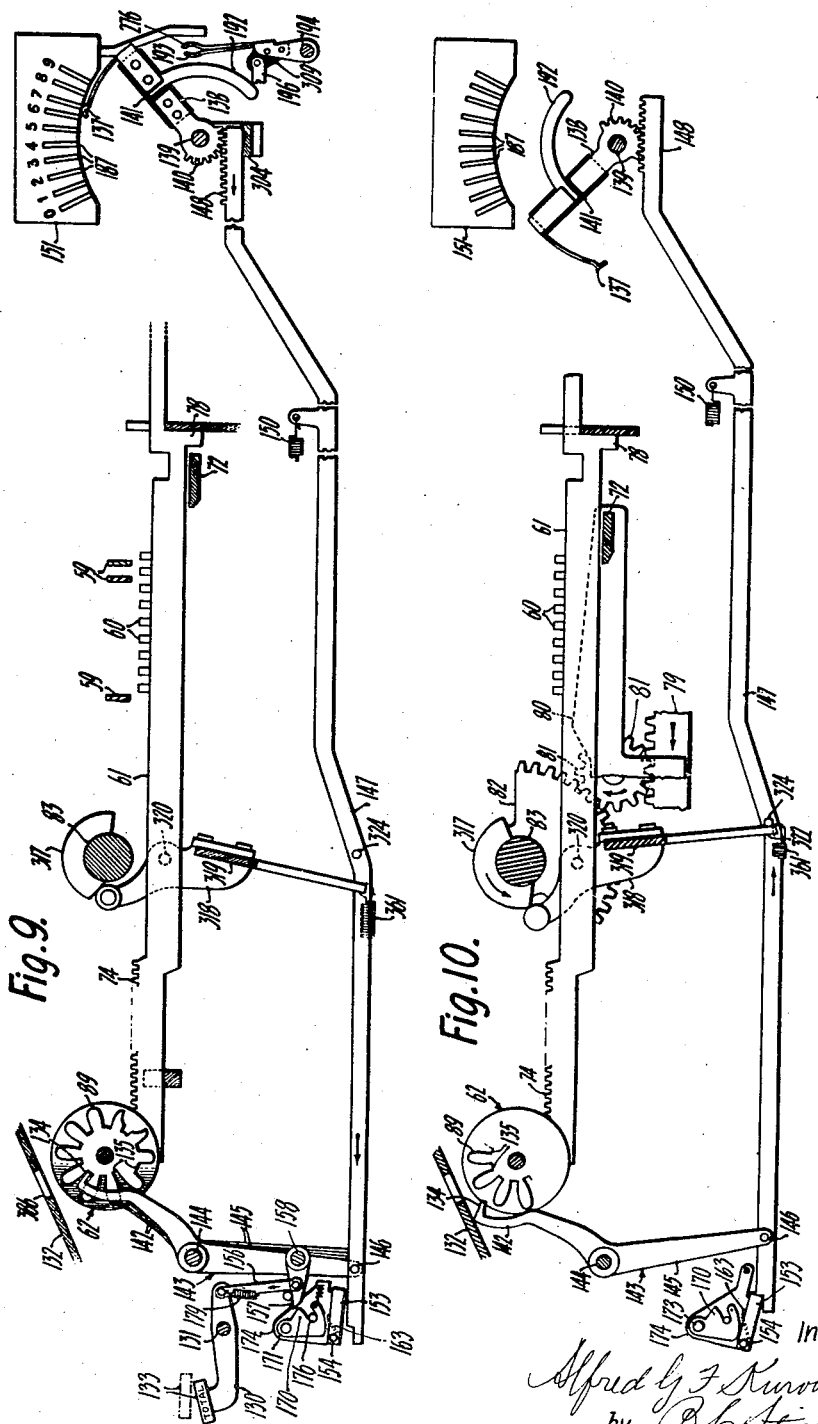

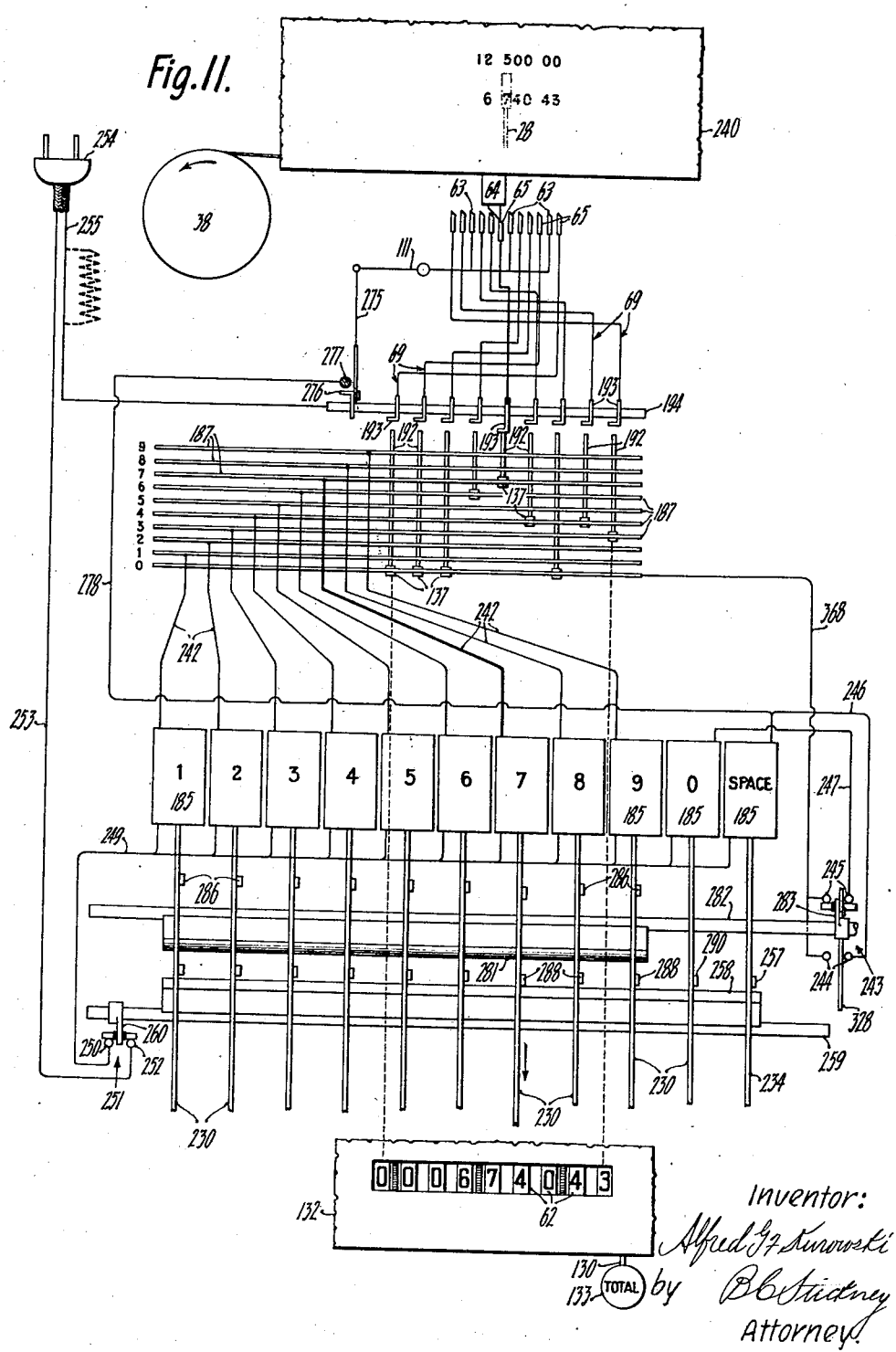

Patented Nov. 16, 1937

2,099,123

UNITED STATES PATENT OFFICE 2,099,123

COMBINED TYPEWRITING AND COMPUTING MACHINE

Alfred G. F. Kurowski, Brooklyn, N. Y., assignor to Underwood Elliott Fisher Company, New York, N. Y., a corporation of Delaware Original application March 15, 1933, Serial No. 660,830. Divided and this application January 27, 1937, Serial No. 122,496

3 Claims. (Cl. 197—13)

This invention is a division of my copending application, Serial No. 660,830, filed March 15, 1933, which relates to combined typewriting and computing machines, and to total-printing mechanism which may be called into use to automatically operate numeral-type-bar trains to print in denominational succession the figures of a total as represented in a set of denominational register-wheels.

The invention of the division herein described pertains more particularly to a governing device effective to regulate the beat of successive printing strokes in the typewriting machine.

In the Underwood bookkeeping machine, to which the invention is herein illustratively applied, the typing of an amount digit by digit on a work-sheet sets up corresponding digit-pins in a denominational series of rack-bars.

Following such typing and setting-up of an amount, the machine is cycled to advance the rack-bars and to rotate register-wheels driven thereby, to extents corresponding to the values of the set pins.

A machine of the above-described class is seen in Patent No. 1,280,065 to O. Minton.

Automatic total-printing solenoids are employed for actuating the numeral and space keys of the typewriting mechanism.

In the present invention the register-dial-wheels control the selection of the printing solenoids according to the digits in the total and the typewriting-machine carriage effects the operation of the selected solenoid at each denomination.

A contact block has one set of conductors, one conductor for each numeral-type-key solenoid from "0" to "9", and is arranged to co-operate with a set of individually movable solenoid-selecting brushes. The solenoid-selecting position of each brush is controlled by means of a feeler normally latched in retracted position and arranged to co-operate with a graded stop carried by the corresponding dial wheel.

Upon operation of a total-key, the several latched feelers are released to drop upon their respective stops and thus move to extents depending, by reason of the grading of said stops, on the digit-representing positions of the dial-wheels. The several brushes, controlled by the feelers, will consequently make contact with such contact-block conductors as will indicate for operation the printing solenoids corresponding to the positions of the several dial-wheels.

The selection, by means of said contact-block and co-operating brushes, of the printing solenoids does not of itself energize the solenoids, since it is desired that the latter be operated one by one, in proper denominational order, as determined by the letter-feed or denomination-determining movements of the typewriting-machine carriage during automatic total-printing. The several circuit completing contact arms, there being one for each solenoid-selecting brush, are actuated seriatim by means of the carriage-controlled denomination-selecting trains to make contact with extensions of their respective brushes, and thereby complete, in denominational order, individual circuits for the selected solenoids.

The improvements include means whereby each energized solenoid, after driving its type-bar train to print, is operative to disable the energizing circuit by means of a switch common to all the solenoids. This de-energizes the solenoid and permits the type-bar to rebound normally from the platen, and also permits self-restoration of the parts whereby the solenoid actuates said type-bar train.

An operating train for the disabling switch is common to all the solenoids and includes a governing device preferably in the form of a fly-weight. Said device has the function of storing energy at the beginning of a solenoid stroke so that said energy becomes available to assist the solenoid in completing the throw of the switch. The fly-weight device has an oscillatory movement and is thus effective to throw the switch back again to restore the circuit for operating a solenoid at the next denomination. The fly-weight device being oscillatory, provision is made for regulating it so that its vibration period harmonizes with the desired speed of typewriting-machine operaton. It is thus assured that the circuit will be disabled and restored in correlation to the desired speed of succession of printing strokes and accompanying carriage-feed movements.

In the course of these automatic typing operations each energized solenoid drives its type-bar toward the printing point. The solenoid circuit of an active solenoid becomes disrupted by the action of the aforesaid switch operating fly-weight before the type-bar reaches the platen. The type-bar may complete its printing stroke by momentum of the parts and the switch operating fly-weight also completes its swing by momentum; and its return stroke, depending on its natural period of oscillation is sufficiently delayed to prevent premature reclosing of the switch. This gives the type-bar enough time to recoil to normal, or nearly normal position, and the carriage is also given enough time to properly arrive at the next denomination preparatory to the typing operation by the next selected solenoid. Liability of double typing impressions in a single space, or inaccurately positioned typing impressions is therefore avoided. The typing impressions are even and the type-bars are not liable to pile up in front of the platen.

Following the operation of the total-key and the resulting selection of the printing solenoids as above described, the typing-machine carriage is in every case tabulated to the highest denominational position in the computing or total-printing zone. The total to be printed, however, may have a less number of denominational places than the denominational capacity of the set of dial-wheels, and, in such case, the full set of dial-wheels will indicate one or more unnecessary zeros ahead of the first significant figure of the total. A space-key operation takes place at each dial-wheel which represents a zero ahead of said first significant figure, and consequently the carriage is automatically spaced from the highest denomination-position to the position where the printing of the total begins.

When the carriage is tabulated to the aforesaid highest denomination in the zone and the dial-wheel at that denomination is at the zero-position, the space-key solenoid, instead of the zero-printing solenoid, will be energized. That is to say, the space-key solenoid is energized by way of the aforesaid brush (in zero-position), by way of the aforesaid circuit-completing contact arm, which has been brought against the brush at the arrival of the carriage at said highest denomination, and, furthermore, by way of a current-path afforded by a two-way switch, which, before the total-key is operated, will have been thrown to cut out the zero-printing solenoid and cut in the space-key-solenoid. The space-key solenoid is operative by means of the aforesaid circuit-disabling switch to de-energize itself after operating the carriage-feed mechanism to step the carriage to the next lower denomination.

The carriage is stepped repeatedly until it reaches the position of the first significant figure of the total as represented in the dial-wheels.

Since the space-key solenoid is at this stage operable by way of a brush at the zero-position, it will be seen that when the carriage arrives at the first significant figure-denomination, the contact brush for that denomination will not be at zero-position, but will be at the position corresponding to said first significant figure. Consequently, the solenoid corresponding to the first significant figure, and not the space-solenoid, will be energized by way of the circuit-completing contact arm at that denomination.

Any significant figure-solenoid is operative to throw the aforesaid two-way switch to cut out further operation of the space-key solenoid by way of a contact brush at the zero-position, and instead cut in the zero-printing solenoid. Thus, all zeros appearing after the first significant figure in the total will be printed.

At the cycling operation following the automatic operation of the type-keys, the two way switch is automatically restored to cut in the space-key solenoid again, so that the latter becomes operative, if necessary, to step the carriage to the first significant figure-denomination without printing zeros at the beginning of automatic printing of the next total.

The usual denomination-selector on the carriage may operate a punctuation-space jack. Several space-jacks may be operative upon a common member. A circuit-completing contact arm (which is an additional arm) may be operated by said member to engage an extension of one of the space solenoid terminals incorporated as a projection in the aforesaid contact block.

The solenoids may be disposed so that simple links serve to connect the several solenoid-plungers to corresponding type-actions.

The contact-brush arms and the feeler-levers are normally in retracted positions. They may be held in such positions against the pull of individual springs which urge the trains, each comprising a feeler-lever, link and contact-brush arm, to operative positions. For releasably holding the feeler-trains, a latch, common to all the trains, is employed. A total-key at the front of the machine is operative to withdraw said latch when it is desired to print a total, the several feelers and contact brushes thereupon assuming positions corresponding to the positions of the dial-wheels, as above described.

Since the dial-wheels are rotated during a computing cycle, following automatic total-printing, the feelers are at the beginning of such cycle withdrawn and relatched.

While the type-bars are shown to be driven by solenoids, the invention pertaining to controlling the speed of succession of type-bar operation is not limited to the type-bar driving means shown; nor is the invention limited to type-bar selection by computing wheels preparatory to seriatim operation of the selected type-bars, since other means may be employed to effect or register a type-bar selecting set up.

Other features and advantages will hereinafter appear.

In the accompanying drawings,

Figure 1 is a perspective view showing a solenoid.

Figure 2 is a side sectional view of the Underwood bookkeeping machine, showing the total-printing mechanism and also showing the novel fly-weight device.

Figure 3 is a perspective view of part of the computing mechanism showing the set of dial-wheels, pin-bar mechanism, cycling mechanism, and also showing the related parts of the total-printing mechanism.

Figure 4 is a perspective view of part of the carriage-controlled train operative to actuate the circuit-completing arm for energizing the space-key solenoid for a punctuation-space.

Figures 6 and 7 are side and front views respectively of one of the totalizer-dial wheels and its graded feeler-stop.

Figure 8 is a skeleton diagram of the machine, showing one of the solenoids as having driven its numeral-type train to print. The positions, under this condition, of the controlling and co-operating parts are also shown.

Figure 9 is a side view illustrating the total key in depressed position and showing a solenoid-selecting brush making contact for the number "7" solenoid.

Figure 10 is a view illustrating how the feelers and contact brushes are retracted and relatched at the start of the machine cycle which follows the printing of a total.

Figure 11 is a diagram representing the circuit-arrangement whereby the solenoids, contact-block conductors, brushes, and circuit-completing carriage-controlled contact arms co-operate. The mechanical elements controlling the circuits are also represented in said diagram.

Figure 5:
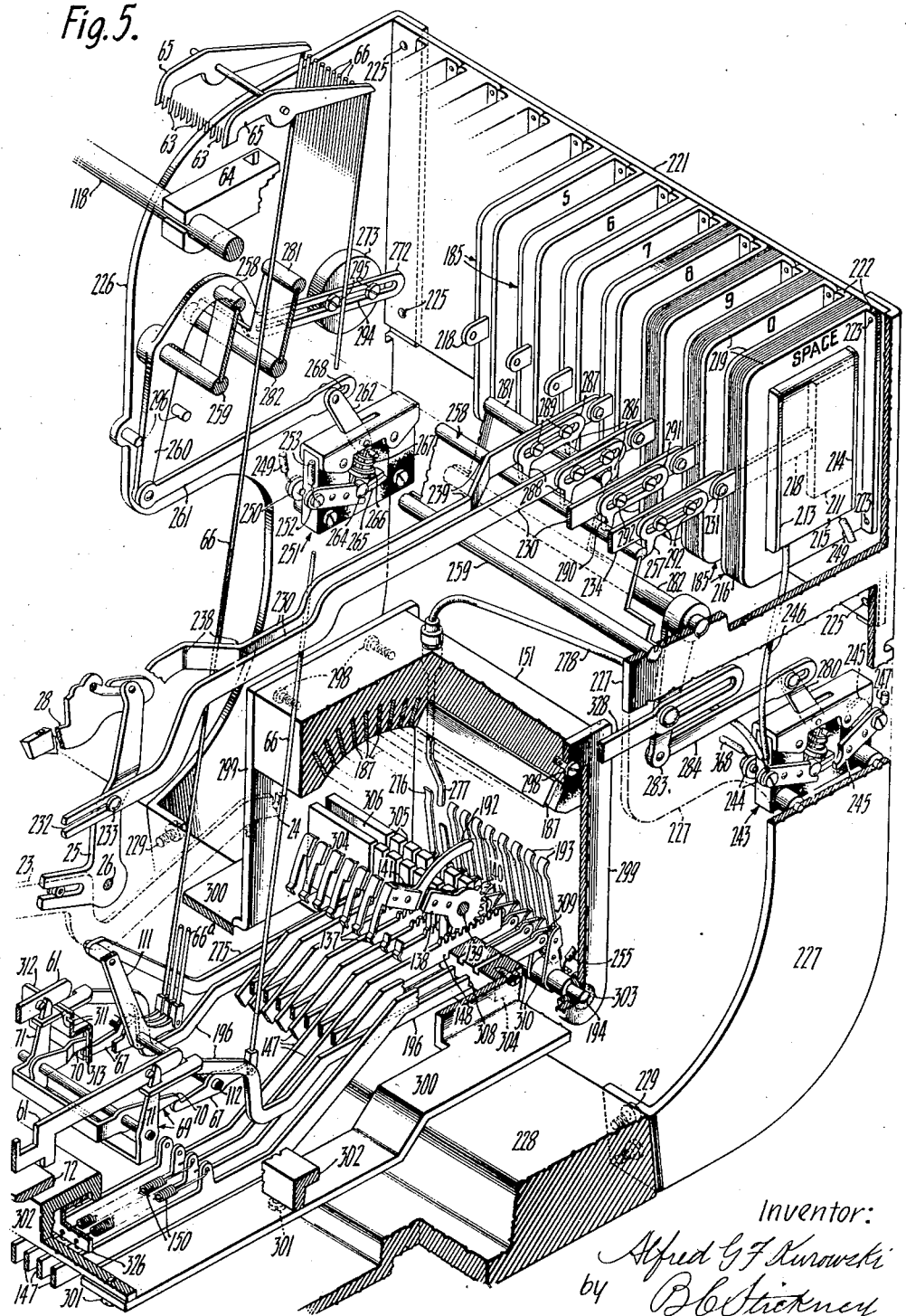
Figure 5 is a perspective view showing the type-bar operating solenoids and connections and showing the novel fly-weight device.

A typewriting machine 20 surmounts a computing base 21 and has the usual row of numeral-keys 22, on key-levers 23, fulcrumed at 24. Manual operation of any key-lever 23 swings a bell-crank 25, fulcrumed at 26, to drive a numeral-type bar 28 toward a platen 29. Each type-bar 28 as it reaches the platen drives the usual universal bar 30 rearwardly to interpose a fixed dog 31 into the plane of an escapement-wheel 32 and concomitantly release a stepping dog 33, which, upon rebound of the type-bar 28, returns to the plane of the escapement-wheel 32, which has a pinion 35 meshing with a rack 36, on a traveling carriage 37, supporting the platen 29. Oscillation of the dogs 31 and 33 about dog-rocker pivot 34, by means of the type-bar 28, letter-feeds the carriage 37 pulled by the usual spring-motor 38. Said carriage travels upon front and rear rails 40, 41, on typewriter-frame 42. The several type-bars 28 normally bear against a rest 44.

A space-key 45 is mounted upon arms 46, fastened to rock-shaft 47, operative, upon pressing said space-key, to swing arm 48, and thereby rock a member 49 connected as seen in Figure 2 to actuate the universal bar 30, and operate the dogs 31 and 33 for a letter-feeding step or space.

The usual tabulating-key lever 51, partly shown, is operative to release the carriage and concomitantly elevate the partly-shown tabulating stop 52 into the path of a counter-stop 53, settable along a rack 54, carried by the typewriter-carriage 37.

Each numeral-key lever 23, when operated, rocks a corresponding shaft 56 by means of a pendant 57. There is one of said shafts for each numeral-key lever 23, from one to nine, and, as described in the aforesaid Minton patent, each shaft when rocked is operative by means of an upper link 58 and other connections, not shown, to depress edgewise a bar 59. Each bar 59 when depressed may set a corresponding digit-pin 60 which is one of a row presented by a pin-bar 61 operative to drive a register-dial-wheel 62. The zero numeral-key lever does not set a digit-pin in the illustrated machine.

As seen in Figure 2, the pin-bars 61 are normally in such position that their pins 60 are somewhat behind and thus out of the path of the pin-setting bars 59. The pin-bars are advanced seriatim to pin-setting position in denominational order corresponding to the letter-feed or denomination-determining advance of the typewriting-machine carriage through a computing zone. The carriage 37 therefore has the usual tappet 64 arranged to engage seriatim a set of pivoted jacks 65, and thereby depress the usual thrust-rods 66 to operate levers 67, Figure 2. A set of transposing levers 69, similar to those seen in the Kupetz Patent No. 1,697,981, dated January 8, 1929, is interposed between the set of levers 67 and the pin-bars 61, each transposing lever having one arm 70 engaged by a lever 67, and another arm 71 offset or transposed, as seen in Figure 3, to move the pin-bar 61 of the same denomination as said latter lever to pin-setting position. For each pin-bar there is the usual spring 68 for retracting the pin-bar from its pin-setting position.

Operation of the numeral-key levers 23 in a computing zone results, by the described usual means, in the setting of corresponding digit-pins in the set of pin-bars 61 preparatory to a cycling operation during which said pin-bars 61 are advanced by means of the set pins to rotate the dial-wheels 62. In said cycling operation, the usual cross-bar 72 makes a forward and return movement. By means of the depressed pins 60, the pin-bars 61 are picked up and advanced by the forward movement of said bar.

Each pin-bar has at its forward end the usual rack 74 meshing with a pinion 75, Figure 6, which, by means of the usual ratchet 76 and pawl 77, has a one-way connection to the dial-wheel 62, so that only the forward movement of the pin-bar 61 may rotate said dial-wheel. The cross-bar 72 in its return movement thus picks up and returns the pin-bars 61, by means of shoulders 78 on the latter, without rotating the dial-wheels. It may also be noted that each dial-wheel has fastened to its side a detent-disk 89 having its edges notched as seen in Figure 2 for co-operation with individual spring-pressed detent-arms 90. The cross-bar 72 is advanced and returned by means of the usual general operator which includes side racks 79 having arms 80, between which the cross-bar 72 is supported. Each rack 79 is connected by a pinion 81 to a sector 82, the two sectors 82 being each fastened to a cross-shaft 83, journaled in the side members of the framework in which said racks 79 are guided. The usual power-driven reciprocatory arm 85 drives the general operator forward and back for a cycle. The power-drive is set forth in Thornton Patent No. 1,283,360.

As the general operator nears the end of its return movement, a pin-restoring plate 94 is raised by means of the usual linkage, which includes bell-cranks 95, links 96 and cross-shafts 97, one of the cross-shafts being operative by the general operator near the end of the return stroke of the latter and carrying an arm not shown, to engage the under side, and thereby raise the pin-restoring plate 94.

The usual key-locking device, operative to prevent depression of more than one numeral-key lever at a time, is also operative to lock the keys when the typewriting-machine carriage 37 is at a punctuation-space in a computing zone. Said mechanism is fully set forth in Gumprecht Patent No. 1,237,895 and includes, for each punctuation-space, a jack 63, additional to the set of denomination-jacks 65, and a thrust-rod 66ª. In the illustrated machine, there is provision for three punctuation-spaces, and, as seen in Figure 4, there are three thrust-rods 66ª. Each thrust-rod 66ª is connected to a lever 111 mounted on a fulcrum-rod 112 with the levers 67 actuated by the set of denomination-thrust-rods 66. The three levers 111, actuating the same mechanism, are joined by connections 113. From the thus joined levers 111, there extends a link 114 to operate the usual shaft 115, which, when rocked, closes the usual set of tumblers 116 to lock the numeral-key levers 23.

The denomination-selecting tappet 64 is mounted as seen in Figure 2 to swing about rod 118 of the carriage, so that it may be disabled by being dropped out of the path of the jacks 65. When the carriage is in a computing zone, the tappet is upheld by means of the usual roll 119, mounted upon a rock-shaft 120 to swing rightward from the position seen in Figure 2.

The tappet-supporting roll 119 is swung to ineffective position immediately at the start of the forward movement of the general operator. One of the racks 79 of the latter displaces the usual lever 122, which, by means of link 123, bellcrank lever 124 and arm 125, fastened to rockshaft 120, causes the latter to be rocked and the tappets 64 to be dropped at the beginning of the machine cycle. For displacing said lever 122, said rack 79 has a cam-notch 126, in which a nose of said lever normally rests as seen in Figure 2, and into which the nose drops again at the end of the cycle for restoring the roll 119 to normal position.

The novel automatic total-printing mechanism will now be described.

At the front of the machine, a lever 130 is freely fulcrumed upon a rod 131 and projects outside of a casing 132 of the computing base to carry a total-key 133. Depression of said totalkey 133 rocks said lever 130 for releasing a set of normally retracted feelers 134 to drop upon graded stops 135 presented by the dial-wheel detent-disks 89. The particular stop 135, engaged by each feeler, being at a graded distance from the retracted position of the feeler, represents the digit-position of the dial-wheel.

Each feeler 134 at the front of the machine, in dropping to its stop-position, moves a contact brush 137, which is located behind the machine. Each contact brush 137, which may be formed as seen in Figure 5, is mounted upon an arm 138, fulcrumed upon a rod 139, the arm 138 being provided with a pinion-sector 140, and being insulated from the brush by an insulator 141.

The several feelers 134 are at the ends of upstanding arms 142 of levers 143, pivoted upon a common fulcrum-rod 144, and having each a downwardly-extending arm 145, pivotally connected at 146 to a link 147 extending rearwardly along the bottom of the machine, as seen in Figure 2, and having at its rear end a rack 148 which meshes with the contact-arm pinion-sector 140. Each link is urged forwardly by an individual spring 150, but is normally held in the Figure 2 position, wherein the contact brushes 137 are retracted from a contact block 151, by a latch-bar 153. Said latch-bar 153 is common to all the feeler-trains and is pivoted at 154 to swing its latching edge upwardly for releasing said trains to move individually to the positions determined by the feelers 134 and co-operating stops 135. This release is effected by operation of the total-key lever 130, which is connected by a link 156 to an arm 157, fastened to a stubshaft 158, journaled in a hub 159 extending from a bracket 160. Said bracket 160 together with a companion bracket 161 (Figure 3) forms a support for the total-key fulcrum-rod 131. The latch-bar 153 is also pivoted between said brackets 160, 161, as seen in Figure 3, and is urged to swing downwardly, by a spring 163 reacting against an ear 164 of bracket 161. The brackets 160, 161 are secured by screws 166 to cross-member 167 of the computing-base framework. Rising from said cross-member 167 are register-supporting plates 168, which may be arranged to support the feelerlever fulcrum-rod 144.

Upward swing of the arm 157 by operation of the total-key 133 causes the end of said arm to displace a cam-nose 170 of a by-pass-piece 171, pivoted at 173 to an ear 174 rising from the latchbar 153, the latter being thus lifted to release the feeler-trains. Said by-pass-piece 171 normally bears against a stop-pin 176 on the ear 174, under the pull of a spring 177, anchored to said ear. The total-key lever 130 and connected parts reassume their normal positions under the pull of a spring 179, said normal positions being determined by abutment of the arm 157 with a pin 178 projecting from bracket 160, Figure 3. In the total-key stroke, the cam-nose 170 is passed over by the end of arm 157, so that the relatching of the latch-bar 153 is not dependent upon release of the total-key by the operator's finger. The by-pass-piece 171 is idly swung about its pivot 173 by downward passage of the end of the arm 157 and restoration of the total-key is therefore not dependent upon said relatching.

The several contact brushes 137, when released to different positions along the contact block 151, as determined by co-operation of the feelers 134, as released by the total-key, cause the the selection of corresponding solenoids 185 for the numeral-type-key trains and space-key train of the typewriting mechanism. One terminal of the winding of each numeral-printing solenoid from zero to nine has its counterpart in and is connected to a conductor 187 of the contact block 151. The several contact-block conductors 187 extend crosswise of the mechanism, so that any one conductor 187 may be contacted by any brush 137. The contact block 151 and its conductors 187 have the arcuate arrangement corresponding to the circular sweep of the brushes as seen in the drawings. Upon operation of the total-key, the contact brush 137 related to each dial-wheel will make contact with the conductor 187 which represents the dial-wheel position.

In Figure 8, the illustrated dial-wheel is at the seven-position, and the feeler 134 for that dial-wheel, resting against the stop 135 of corresponding gradation, will have caused the related brush 137 to have moved to the conductor 187 representing the solenoid for the seven-type-key train. Other contact-brush positions corresponding to other dial-wheel positions are determined by corresponding depths of the graded stops 135. Thus, for the zero-position of the dial-wheel, the movement of the feeler 134 is the least, and, for the nine-position of the dialwheel, the feeler movement is greatest. Since the slots which form the graded stops 135 as seen upon the detent-disks 89 also serve as detentnotches for the co-operating detent-levers 90, it results that each feeler has an idle movement from its normal position before it comes within range of the graded stops 135. This idle movement arises from the necessity of retracting the feelers entirely clear of the detent-disks 89, so that ordinary rotation of the dial-wheels is not obstructed. Furthermore, this idle or excess movement of the feelers permits the contact brushes 137, in their normal position, to be fully retracted from the contact block 151. Movement of the contact brushes 137 into solenoid-selecting positions is not of itself effective to energize the solenoids, since it is desired that the latter be energized, one by one, for individual operation of the numeral-type-key trains. Following operation of the total-key, the typewriting-machine carriage 37 is, by operation of the tabulatingkey lever 51, tabulated to the highest denomination in the computing or total-printing zone, and the solenoid selected for that denomination is caused to be energized, as will now be described.

Each contact brush 137 has an extension presenting an arcuate surface 192, which, in any effective brush-position, is opposite a contact arm 193. There is one of said arms 193 for every brush, that is, for every denomination, and the several contact arms 193 are individually swingable upon a common fulcrum-rod 194, and are normally in such position that they do not make contact with the arcuate contact surface 192. The carriage 37, as it reaches the highest denomination-position to which it is tabulated, as aforesaid, moves the first contact arm 193 against its contact surface 192, thereby energizing the solenoid which is to be operative at that denomination. The resulting operation of the typewriting mechanism causes said carriage 37 of the latter to escape to the next denomination to move the next contact arm 193 and concomitantly cause restoration of the first moved contact arm. The several contact arms 193 are thus brought against their contact surfaces 192 seriatim, and, for this purpose, the usual denomination-selecting trains associated with the pin-bars 61 and operable seriatim may be employed. To this end, the arms 71 of the several transposing levers 69 of said denomination-selecting trains are enabled to actuate the contact arms 193, each arm 71 being connected to a corresponding contact arm 193 by a link 196. Said link may be formed as seen in the drawings, and is pivotally connected at its rear end to the contact arm 193. At its forward end, each link 196 is perforated to slip over the transposing lever-arm 71.

It is desired when a total is printed, as a result of operation of the total-key 133, that the dial-wheels 62 be cleared or restored to their zero-positions in a machine cycle which follows the printing operation. For this purpose the machine is conditioned for subtraction by the operation of the total-key, which operates the stub-shaft 158 having an arm 201 (Figure 3) to operate a link of a subtraction-setting mechanism as shown and described in said original application #660,830.

Each solenoid 185 has a movable plunger 211 working within a non-magnetic sleeve 212, Figure 1, of narrow rectangular section. Said sleeve has end flanges 213 and 214 to form a bobbin, upon which is placed a solenoid-winding 215.

A C-shaped laminated iron frame 216 for the magnetic circuit encompasses the solenoid-winding 215 as seen in Figure 1, and its yoke-portion reaches into the sleeve 212 to form a pole-face 217 opposite the inner end of the solenoid-plunger 211. The ends of said frame 216 may abut the top and bottom of the bobbin-sleeve 212, which may extend beyond the bobbin-flange 214. The inner laminations of said frame 216 may be arranged to clear a non-magnetic link 218 extending through the yoke-portion, from the solenoid-plunger 211, for connection to the parts actuated by the plunger. The laminations of the frame 216 are clamped between outer plates 219 drawn together by screws 220. All the solenoids 185 are supported upon a plate 221 by means of flanges 222 formed on said clamp-plates 219, the solenoids being secured to the supporting plate 221 by screws 223. The supporting plate 221 has perforations 224, Figure 2, for clearing the solenoid-plungers and is supported and fastened by screws 225 between bracket-plates 226 and 227 formed as seen in Figures 2 and 5, for attachment to the rear edge of a platform 228 by screws 229, Figure 2. Said platform may be part of the usual stand on which rests the combined typewriting and computing machine.

The plungers 211 for the printing solenoids are each connected to the bell-crank 25 of the corresponding numeral-printing type-action by a link 230. The rear end of each link 230 is connected to the solenoid-plunger link 218, at 231. The forward end of each link 230 has a slot 232 for articulation with a headed stud 233 presented by the type-action bell-crank 25. Each type-action is manually operable independently of the solenoid-train. The plunger 211 for the space-key solenoid operates through a link 234 having at its forward end a slot 235 for articulation with a headed stud 236 of an arm 237 fastened to the space-key rock-shaft 47. Where necessary, for clearing parts of the machine, the links 230 and 234 may have bends as at 238, 239, Figure 5.

The total which is to be automatically printed may have a less number of denominational places than the set of dial-wheels 62. In the diagram at Figure 11, the total 6 740 43 is displayed in a dial-wheel set having nine wheels, and the three dials ahead of the wheel showing the first significant figure of said total display zeros. Said diagram represents the set of contact-block conductors 187 and the positions of the brushes 137 as determined by said total represented in the full set of wheels 62. Thus the contact brushes 137, related to the first three dial-wheels at zero-position, are shown in the diagram as making contact with the zero-conductor 187.

Each of the conductors 187 for the digits from one to nine has a direct connection 242 to one of the two terminals of a corresponding printing solenoid. The conductor 187 for zero has no such direct connection to the zero-printing solenoid, because it is desired that the latter shall be inoperative for each dial-wheel, ahead of the first significant figure, which registers a zero. In such case, instead of the zero-solenoid being operative, the space-key solenoid, represented in the Figure 11 diagram, is rendered operative. Following the printing of the first significant figure "6", the zero-solenoid, however, is to be operative, so that all zeros after the first significant figure of the total may be printed, and it will be seen therefore that operation of the space-solenoid by way of the zero-conductor 187 must be cut out at the printing of the first significant figure. A two-way tumbler-switch 243 is accordingly provided and is operative, when thrown one way, to bridge a pair of contacts 244 for cutting in the space-key solenoid and to bridge another pair of contacts 245, when thrown the other way, to cut in the zero-printing solenoid, the switch being arranged so that when one of these solenoids is cut in, the other one is cut out. As seen in the diagram at Figure 11, the zero-conductor 187 is connected to one of each of the pairs of contacts 244 and 245. The other one of the pair of contacts 244 is connected to the space-solenoid by a lead 246, and the other one of the pair of contacts 245 is connected to the zero-solenoid by a lead 247. The Figure 11 diagram also represents the set of circuit-completing contact arms 193, and also represents a worksheet 240 on which the total is automatically printed. The denomination-selecting trains and the denomination selector or tappet 64 on the typewriter-carriage are also represented in Figure 11, said trains being represented by their jacks 65 operative as hereinbefore described to actuate the circuit-completing contact arms 193 in the transposed denominational order represented in the diagram. The printing solenoids from zero to nine and the space-solenoid have a common connection 249 (see Figure 11) to a contact 250 of a circuit-disabling-tumbler switch 251 whose function will be described presently.

Another contact 252 of said switch 251 is connected to one side 253 of the current-supply line represented by the plug 254. The switch 251 is normally in such position that its contacts 250 and 252 are bridged. It will be seen now that when the typewriting-machine carriage 37 is tabulated to the highest denomination, the jack 65 at the extreme right of Figure 11 will be actuated, causing the circuit-completing contact arm 193 for that denomination to be closed upon the arcuate contact surface 192 presented by the brush 137, the latter engaging the zero-conductor 187, since the dial at that denomination stands at zero. The two-way switch 243 will not be in the Figure 11 position, since Figure 11 shows a later stage of the total-printing operation which will presently become clear. Instead said two-way switch 243 will be in position to bridge the contacts 244, and consequently, instead of the zero-solenoid being operative, the space-key solenoid will be operative at the highest denomination. Thus, when the carriage arrives at said highest denomination, the space-key solenoid will be energized through the following circuit: Through one side 255 of the supply-line, the common fulcrum-rod 194 for the contact arms 193, the highest-denomination contact arm 193, brush-extension surfaces 192, the brush 137, the zero-conductor 187, the bridged contacts 244, the lead 246, the space-solenoid, the lead 249, and thence through the closed switch 251 to the other side 253 of the supply-line. The space-solenoid being thus energized at the highest denomination, its plunger will be actuated, and will, by means of the link 234 and arm 237, actuate the space-key rock-shaft 47, to rock the escapement dogs 31, 33 in rearward direction. Said escapement dogs having been thus rocked, the space-key solenoid is then de-energized to permit the return of the dogs and the space-key train for stepping the carriage 37 one letter-space. For so de-energizing the space-solenoid, the circuit-disabling switch 251 is operated to break the connection between the contacts 250 and 252.

Means whereby the switch 251 is opened by the space-key solenoid include a projection 257 on the space-solenoid link 234, so that said link by its forward movement from the Figure 2 position may operate a universal bar 258, mounted on a rock-shaft 259, said rock-shaft having an arm 260 connected by a link 261 to an operating lever 262 of the switch 251. Said universal rock-shaft 259 may be journaled in the bracket-plates 226, 227.

The disabling switch 251 may be any suitable type of snap switch. The one illustrated includes a bridging bar 264, Figure 5, movable along an insulated saddle 265 between positions for opening and bridging the contacts 250, 252. A push-rod 266 for said bar 264 has a pin-and-slot connection with the switch-lever 262, to form with the latter a toggle breakable to either side of dead center. A spring 267 surrounds the push-rod and is compressed between the end of said switch-lever 262 and a shoulder at the base of said push-rod.

With the disabling switch 251 in the Figure 5 position, the first part of the movement of its lever straightens the toggle and compresses the spring 267 without moving the bridging bar from the contacts 250, 252. It will be evident that further movement of the lever 262 will bring the toggle past its dead center. The force of the spring 267 will thereupon be directed to suddenly snap the bridging bar 264 away from the contacts 250, 252, and project it into the opposite corner of the saddle 265. By similar operation of the parts, the switch is closed again by swinging its lever 262 the opposite way. The movement of the switch-operating link 261 need only be enough to move the switch-lever 262 until the spring 267 becomes effective to snap the bar 264 one way or the other, said spring thereupon operating to complete the movement of said switch-lever 262. Said link 261 therefore has a pin-and-slot connection 268 to the switch-lever, arranged to start said lever in either direction and permit the latter to complete its movement without further movement of the link.

The described switch 251 and its operating train from the universal bar 258 are arranged to break the space-solenoid circuit after the latter has been maintained long enough to have caused the carriage-escapement dogs 31 and 32 to have rocked rearwardly, to the Figure 8 position. The usual space-key-restoring spring 270, Figure 2, thereupon restores the space-key train, causing the dogs 31, 33 to move forward again. By the described operation of said dogs by the space-solenoid, the carriage 37 takes the usual step to the next denomination or space.

For causing the disabling switch 251 to be closed again, so that it may function for the next denomination or space, the switch-operating rock-shaft 259 has an arm 272 carrying a flyweight 273, which is lifted when said shaft is rocked by the space-solenoid to open the switch 251. The resulting described de-energization of the solenoid permits said weight to drop again, thereby swinging the rock-shaft 259 the opposite way to reclose said switch 251 in correlation to the arrival of the carriage at said next denomination or space. Said weight 273 has a speed-regulating function which will be described later.

According to the diagram at Figure 11, said next space at which the carriage arrives corresponds to a punctuation-space and requires operation of the space-solenoid again by way of a punctuation-space circuit, which may be called into use by means of the previously-described key-locking mechanism operated at each punctuation-space. To this end, there extends from one of the coupled levers 111, Figure 4, operable by any punctuation-space jack 63, a link 275 connected to a circuit-completing contact arm 276 mounted on the same fulcrum-rod 194 with the other contact arms 193. Said space-contact arm 276 is thus, by operation of any space-jack 63, swung rearwardly against a fixed contact bar 277 extending downwardly from the contact block 151. The circuit for operating the space-solenoid for a punctuation-space is as follows: Supply-line side 255 to fulcrum-rod 194, punctuation-contact arm 276, contact bar 277, thence by lead 278 to the space-solenoid, from which the circuit continues through the common solenoid-lead 249 and the closed switch 251 to the other side 253 of the supply-line. The arm 276 is urged away from the contact bar 277 by means of a spring 279, Figure 4.

Thus, at the operation of the space-solenoid by means of the first punctuation-space jack 63 encountered by the carriage, the latter is stepped to the next denomination, which, in the Figure 11 diagram, is that for the second dial-wheel 62 from the left. Since the dial here stands at zero and the contacts 244 of the two-way switch 243 are still bridged, the space-solenoid will again be operated to step the carriage to the third wheel denomination. Here the dial-wheel also displays zero, and therefore the space-solenoid is again operated, bringing the carriage now to the fourth dial-wheel denomination.

At the fourth denomination, the dial-wheel displays six, the first significant figure of the total. The contact brush 137 for said fourth dial-wheel therefore is in position against the contact-block conductor 187 for the solenoid operating the six numeral-key, the circuit being completed by the contact arm 193 at said fourth denomination resting against the contact surface 192 of the brush. The printing solenoid for six is therefore energized by the following circuit: Supply-line side 255, fulcrum-rod 194, contact arm 193, at the fourth denomination, conductor 187 for the six-solenoid, thence by the connection 242 extending to said solenoid, from which the circuit is completed by way of the common solenoid-lead 249, closed switch 251, and the other side 253 of the supply-line.

All zeros after the first significant figure are to be printed, and, therefore, at the printing of said first significant figure, the space-solenoid is disconnected from the zero-conductor 187, and the zero-solenoid, instead, is connected to said conductor. At the printing of the first significant figure, the two-way switch 243 is therefore thrown to the Figure 11 position, in which a circuit to the space-solenoid by way of the contacts 244 is broken and a circuit is established to the zero-solenoid by way of the contacts 245.

The first operation of any significant figure-solenoid from one to nine is effective to so throw said switch 243. An operating lever 280 of said switch 243 is connected to a universal bar 281, mounted on a rock-shaft 282, journaled in the bracket-plates 226, 227. An arm 283 of said rock-shaft 282 is connected by a link 284 to said operating lever 280. The switch 243 operates similarly to the described operation of the switch 251 in respect to the snapping of its bridging bar to either one of its two positions.

The link 230 for each printing solenoid, from one to nine, has a projection 286 engaging the universal bar 281 for operating the latter to throw the switch 243. Each projection 286 may be combined in one plate 287, with a projection 288 for operating the disabling switch universal bar 258. The plates 287 are adjustably secured to their links as indicated in Figure 5, by screws 289.

At each operation of a printing solenoid from zero to nine, the disabling switch 251 is opened and reclosed by means of the universal bar 258 and fly-weight 273 as described for operation of the space-solenoid. The link 230 from the zero-solenoid needs only a single projection 290, which is for operating the disabling switch universal bar 258, there being no need for the zero-solenoid operating the two-way switch 243, since the zero-solenoid is not for a significant figure. The projections 257 and 290 for the space and zero solenoid-links may also be formed on plates 291 adjustably secured by screws 292.

The two-way switch remains in the Figure 11 position while all the remaining figures of the total are completed, the printing of all figures, including zeros, after the first significant figure, and the interposition of punctuation-spaces wherever necessary, being effected one by one by means of the appropriate solenoids in a manner which will now be clear from the preceding description of operations.

The Figure 11 diagram represents the seven-solenoid as being energized at the denomination which corresponds to the fifth dial-wheel from the left, said fifth wheel displaying seven. It will be understood that, in the course of automatic total-printing, the contact arms 193 are operated seriatim, as the carriage 37 moves through the total-printing zone, there being interposed in said seriatim operation an operation of the contact arm 276 to energize the space-solenoid at each punctuation-space.

The fly-weight 273 oscillates up and down under the recurring impulses of the universal bar 258 during the course of total-printing. Its natural vibration period or beat therefore determines the speed of consecutive solenoid-operations. For varying said period of vibration, and hence regulating the intervals between successive solenoid-strokes, the fly-weight 273 is mounted so that it may be set at different distances from the rock-shaft 259 on which it is mounted, the mass of said fly-weight 273 being preferably a suitably fixed factor. The arm 272 may accordingly be provided with a slot 294 through which pass screws 295 by which the fly-weight is secured to said arm. The slot 294 permits adjustment of the fly-weight 273 along the arm 272. For limiting the movements of the fly-weight 273, there may project from the bracket-plate 226 stop-pins 296 co-operating with the fly-weight rock-shaft arm 260.

The fly-weight 273 functions to store switch-operating energy at the start of the solenoid-stroke so that the solenoid is relieved in great part of the burden of opening the de-energizing switch 251 just at the moment when said solenoid is about to be de-energized. There is thus available such unimpeded momentum of the solenoid-operated type-train as is needed for smoothly completing the printing stroke and permitting normal rebound of the type-bar from the platen. The necessity for using burdensome restoring springs is avoided because the return beat of the fly-weight co-operates to restore the parts after each power-stroke.

The fly-weight conduces to smooth succession of the automatic type-train and space-bar operations and the speed of succession may be regulated by shifting said fly-weight 273 along the arm 272.

The upper dotted circle 297, Figure 8, represents the limit of upward movement in the natural beat of the fly-weight 273. It will be noted that the pin-and-slot connection 268 to the switch-lever 262 is arranged to permit the flyweight to freely reach the limit of its upward beat. The small dotted circle 307 adjacent the universal bar 258 represents the position of the latter when the solenoid is de-energized, and hence said small circle indicates that the completion of the printing stroke is made under the momentum of the parts of the solenoid-driven train.

The contact block 151 may be secured by screws 298 between upstanding plates 299 having forwardly-reaching arms 300 secured by screws 301 to a cross-member 302 of the machine-framework. The current-conducting fulcrum-rod 194 for the carriage-operated contact arms 193, 276 is supported by said plates 299 in insulating bushings 303. Said plates 299 also support a cross-bar 304 having upper slots 305 in which the rear or rack ends of the brush-arm links 147 are slidably seated. Said bar 304 may be of such height that its slots 305 also guide the contact-brush arms 138, the bar having a groove 306 through which passes the brush-arm fulcrum-rod 139. The links 196, 275 from the contact arms 193, 276 are laterally guided by lower slots 308 in said cross-bar 304 and are connected to said current-conducting contact arms by insulators 309. Said contact arms may have individual hubs 310 to space them apart and to make broad contact with the fulcrum-rod 194. At their forward ends the contact-arm links 196 slidably bear in slots 311, Figure 5, of an upward extension 312 of the usual spacing comb 313, in which play the co-operating levers 67 and arms 70 of the denomination-selecting trains for the pin-bars 61.

At the escape of the typing-machine carriage 37 after the last figure of the total has been automatically printed, the counter-stop 53 on said carriage actuates the usual lever 316, Figure 2, effective through the usual connections, not shown herein but described in said Minton patent, to initiate a power-driven machine cycle. During said cycle the cross-bar 72 of the general operator advances, and in such advance the pins set during the total-printing operations are encountered, and the pin-bars are thereby driven to clear the dial-wheels 62, it being remembered that previously the machine was conditioned for subtraction by the operation of the total-key 133.

Before the general-operator cross-bar 72 encounters any of the set digit-pins 60, it moves idly. There is thus afforded time for first effecting withdrawal of the feelers 134 so that they may not interfere with rotation of the dial-wheels 62. The general-operator cross-shaft 83 has a pair of cams 317 for actuating a pair of levers 318, between which is supported a restoring plate 319, said levers 318 being pivoted at 320 upon brackets 321 extending from the register-side plates 168. The restoring plate 319 has downwardly-extending fingers 322 for engaging pins 324 upon the feeler-links 147. The restoring cams 317 are arranged to swing the plate 319 to the Figure 10 position before the dial-wheels are started upon their rotation. The feeler-links 147 are thereby drawn rearwardly, the feelers 134 and brushes 137 are retracted, and the latch-bar 153 is dropped into holding position.

The restoring cams 317 have, as seen in the drawings, a dwell to insure that the feelers 134 cannot drop toward the dial-wheels again while the latter are being rotated. The movement of the general-operator cross-shaft 83 is oscillatory, and thus by said dwell the restoring plate 319 is held in its Figure 10 position until its levers 318 drop off the restoring cam 317 at the end of the cycle. When the restoring-plate levers 318 drop off their cams 317 at the end of the cycle, the feeler-links 147 settle against the latch-bar 153 under the pull of their springs 150 which may be attached to an anchor-plate 326 secured to the cross-member 302 of the framework, Figure 5.

At the start of a machine cycle, the shaft 120 is rocked as already described for dropping and thereby disabling the denomination-selecting tappet 64. The rocking of said shaft 120 may be employed to reset the two-way switch 243 to bridge the contacts 244, thereby reconnecting the space-solenoid to, and disconnecting the zero-solenoid from, the zero-conductor 187. Thus, when a new total is to be printed, the space-solenoid will be operative to automatically step the carriage along to the denomination where the first significant figure appears in the dial-wheels. Said shaft 120 has fastened thereto a downwardly-extending arm 327 which may be connected by a link 328 to the arm 283 which, it will be remembered, was moved by the universal bar 281, at the printing of the first significant figure, to the Figure 8 position for throwing said switch 243 to cut in the zero-solenoid. The swing of said arm 327 at the start of the cycle to the dotted-line position 325 of Figure 8 causes the switch 243 to be thrown back to the position, Figures 2 and 5, wherein the space-solenoid is cut in.

As seen in Figure 2, each conductor 187 is fitted into a slot of the contact block 151 so that the conductors have the illustrated arcuate and radial arrangement in which their lower edges may be engaged by any one of the contact brushes 137. Said brushes 137, having the spring-like form as indicated, move with resilient pressure over the contact block 151 and its conductors 187. Said pressure may serve to brake the feeler-trains as they move against the stops 135.

The operation of the machine will be readily understood from the foregoing description, and may be summarized as follows:

The depression of the total-key 133 raises the latch-bar 153 and releases the solenoid-selecting trains so that the feelers 134 move against those stops 135 which happen to be opposite each individual feeler. The series of stops 135 for each dial-wheel form in effect a digit-evaluating curve or spiral, and each co-operating feeler will therefore, as determined by said curve, move a distance corresponding to the position of its dial-wheel. The differential register-reading movements of the feelers 134 are translated into corresponding movements of the solenoid-selecting contact brushes 137 so that each brush engages the contact-block conductor 187 corresponding to the solenoid which represents the figure represented by the dial-wheel. Thus, as indicated in the diagram at Figure 11, the set of contact brushes 137 contact those conductors 187 which correspond to the dial-wheel positions shown in said Figure 11.

Operation of the total-key 133 also conditions the machine for subtraction. Following operation of the total-key 133 and the resulting shift of the contact brushes 137 from their normally retracted positions, the carriage 37 is tabulated to the highest denomination whereupon energization of the selected solenoids, one by one, commences as soon as the first contact arm 193, at the highest denomination, is closed upon its contact surface 192. After the printing of the last figure of the total, the machine is automatically cycled by means of the counter-stop 53 which reaches the cycle-initiating lever 316 as the carriage takes the usual letter-feeding step after the printing of said last figure. During the cycle the dial-wheels are rotated to zero-positions.

It will be noted that the solenoids 185, the switches 243, 251 and their operating trains, the contact block 151 and associate contact parts, and the carriage-operated contact arms 193, 276 are all grouped together at the rear of the machine. By such arrangement these parts are readily accessible, and grouped together as indicated they may be treated as a detachable unitary assembly.

Variations may be resorted to within the scope of the invention, and portions of the improvements may be used without others.

Having thus described my invention, I claim:

1. In a typing machine having a set of types and a letter-feeding carriage, the combination of a set of power-driven actuators for operating said types consecutively in predetermined order in correlation to the carriage-steps, and means, co-operating with said carriage and including an oscillatory weight, for controlling the intervals between the consecutive type-operations, said means and weight being arranged so that said intervals depend on and therefore coincide with the natural period of oscillation of said weight.

2. In a typing machine having a set of types and a letter-feeding carriage, the combination of a set of power-driven actuators for operating said types consecutively in predetermined order in correlation to the carriage-steps, and means, co-operating with said carriage and including an oscillatory weight, for controlling the intervals between the consecutive type-operations, said means and weight being arranged so that said intervals depend on and therefore coincide with the natural period of oscillation of said weight, said weight being arranged so that its period of oscillation may be varied to thereby regulate the speed with which the type-operations succeed one another.

3. In a typing machine having a set of types, a platen and a letter-feeding carriage, the combination of a set of type-operating electromagnets operable consecutively in selected order, a carriage-operated contact device whereby, at each carriage-step, an energizing circuit to a selected magnet is closed, a switch, a switch-operating member operable by any magnet for breaking said circuit when the type-bar has been driven to the platen, and an oscillatory weight operatively coupled to said switch-member, said weight cooperating by the momentum of its swing in one direction to operate said switch-member for breaking said circuit, and operative in the return swing to reclose the switch in correlation to the carriage-step which ensues upon said driving of the type to the platen, the natural period of oscillation of said weight determining the speed with which the consecutive type-operations succeed one another.

ALFRED G. F. KUROWSKI.